United States Patent
Conway et al.

(10) Patent No.: US 8,005,429 B2
(45) Date of Patent: Aug. 23, 2011

(54) WIRELESS COMMUNICATION NOISE SUPPRESSION SYSTEM

(75) Inventors: Patrick R. Conway, Houston, TX (US); Brian D. Ryder, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1100 days.

(21) Appl. No.: 11/527,783

(22) Filed: Sep. 27, 2006

(65) Prior Publication Data

US 2008/0076356 A1 Mar. 27, 2008

(51) Int. Cl.
*H04B 1/00* (2006.01)
*H04B 15/00* (2006.01)
*H04B 17/00* (2006.01)

(52) U.S. Cl. .................................. 455/63.1; 455/67.13

(58) Field of Classification Search ............... 455/63.1, 455/562.1, 575.1, 575.5, 575.7, 97, 121, 455/501, 67.13, 570, 114.2, 559; 174/68.1, 174/71 C, 75 C, 88 C; 439/578

See application file for complete search history.

(56) References Cited

U.S. PATENT DOCUMENTS

| | | | |
|---|---|---|---|
| 3,766,500 A | 10/1973 | Lykke | |
| 4,486,252 A | 12/1984 | Lloyd | |
| 4,970,352 A | 11/1990 | Satoh | |
| 5,091,707 A | 2/1992 | Wollmerschauser et al. | |
| 5,477,011 A | 12/1995 | Singles et al. | |
| 6,215,449 B1 | 4/2001 | O'Neill, Jr. | |
| 6,710,673 B1 | 3/2004 | Jokerst | |
| 6,757,523 B2* | 6/2004 | Fry | 455/78 |
| 6,975,178 B1* | 12/2005 | Kessler et al. | 333/105 |
| 7,012,496 B2 | 3/2006 | Sugiura et al. | |
| 7,232,432 B2* | 6/2007 | Fulton et al. | 604/509 |
| 7,256,978 B2* | 8/2007 | Deines et al. | 361/117 |
| 7,373,169 B2* | 5/2008 | Yoshino | 455/550.1 |
| 2002/0151328 A1 | 10/2002 | Shin et al. | |
| 2004/0118582 A1 | 6/2004 | Deguchi | |
| 2006/0032658 A1 | 2/2006 | Abe | |

* cited by examiner

*Primary Examiner* — Eugene Yun

(57) ABSTRACT

A wireless communications noise suppression system comprises an electronic device having wireless module communicatively coupled to an antenna via a cable, an intermediate portion of the cable conductively coupled to ground.

20 Claims, 1 Drawing Sheet

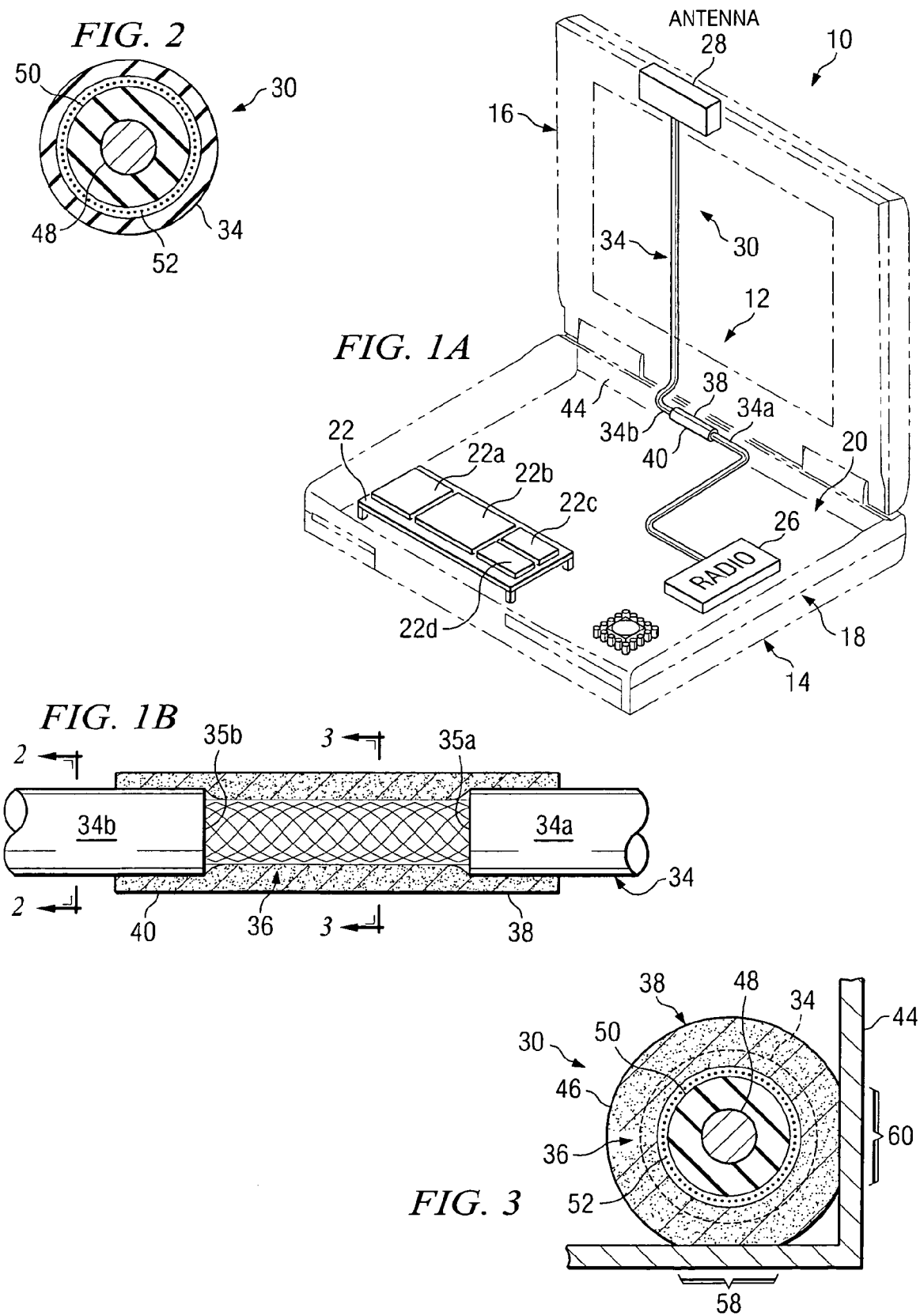

WIRELESS COMMUNICATION NOISE SUPPRESSION SYSTEM

BACKGROUND OF THE INVENTION

As wireless communication devices approach the outer boundaries of wireless network coverage, the wireless signal strength may be substantially reduced or weakened. Further, wireless signals are susceptible to noise generated from within an electronic device housing the wireless communication device, which can further adversely affect the strength of the signal. For example, noise generated from computer chips within a laptop computer having a wireless communication device may overpower and/or adversely affect the wireless signal, thereby causing a network connection loss.

BRIEF DESCRIPTION OF THE DRAWINGS

For a more complete understanding of the present invention, and the objects and advantages thereof, reference is now made to the following descriptions taken in connection with the accompanying drawings in which:

FIG. 1a is a diagram of an electronic device in which an embodiment of a wireless communications noise suppression system in accordance with the present invention is employed to advantage;

FIG. 1b is a diagram illustrating an enlarged view of a portion of the noise suppression system illustrated in FIG. 1a in accordance with the present invention;

FIG. 2 is a diagram illustrating a section view of a portion of the wireless communications noise suppression system illustrated in FIGS. 1a and 1b taken along the line 2-2 of FIG. 1b; and FIG. 3 is a diagram illustrating a section view of a portion of the wireless communications noise suppression system illustrated in FIGS. 1a and 1b taken along the line 3-3 of FIG. 1b.

DETAILED DESCRIPTION OF THE DRAWINGS

The preferred embodiments of the present invention and the advantages thereof are best understood by referring to FIGS. 1a-3 of the drawings, like numerals being used for like and corresponding parts of the various drawings.

FIGS. 1a and 1b are diagrams of an electronic device 10 in which an embodiment of a wireless communications noise suppression system 12 in accordance with the present invention is employed to advantage. In the embodiment illustrated in FIGS. 1a and 1b, electronic device 10 comprises a laptop or notebook computer device 14 comprising a display member 16 rotatably coupled to a base member 18. However, it should be understood that electronic device 10 may comprise any type of computer device such as, but not limited to, a desktop computer, a tablet personal computer, a handheld computing device, a music player, or any other type of portable or non-portable electronic device having wireless communications capabilities.

In the embodiment illustrated in FIGS. 1a and 1b, electronic device 10 comprises a wireless communications assembly 20 for enabling wireless communications between electronic device 10 and a wireless communications network (e.g., wireless signals in the form of communication data and/or control signals). Noise suppression system 12 is used to substantially reduce and/or eliminate noise or other interference (e.g., radio frequency interference, electromagnetic interference, and/or electromagnetic waves) generated by components within electronic device 10 such as, but not limited to, noise or interference caused by and/or otherwise associated with a circuit board 22 disposed within base member 18 (e.g., chips 22a, 22b, 22c and/or 22d disposed on circuit board 22) or any other noise-generating device or component disposed within electronic device 10. Wireless communications assembly 20 may be configured for a wireless wide area network (WWAN), a wireless local area network (WLAN) or any other type of wireless communications network.

In the embodiment illustrated in FIGS. 1a and 1b, wireless communications assembly 20 comprises a wireless radio or module 26 disposed in base member 18, an antenna 28 disposed in display member 16 and at least one cable 30 communicatively coupling module 26 to antenna 28. However, it should be understood that wireless communications assembly 20 may be otherwise configured (e.g., module 26 and antenna 28 both disposed in base member 18, module 26 and antenna 28 both disposed in display member 16, etc.). Further, it should be understood that electronic device 10 may be configured having multiple modules 26 and/or antennas 28. In some embodiments of the present invention, cable 30 comprises a coaxial cable communicatively coupling module 26 with antenna 28; however, it should be understood that other types of cables 30 may be used. For example, in some embodiments of the present invention, cable 30 may comprise an external braid surrounding a plurality of cable elements.

Generally, noise generated by circuit board 22, chips 22a-22d or other devices or components of electronic device 10 may interfere with and/or adversely affect the performance of wireless communications assembly 20 (e.g., the wireless signal strength). For example, noise generated by chip 22a may radiate onto cable 30 and propagate toward antenna 28, which may hinder the signal strength, thereby resulting in a network connection loss, especially when electronic device 10 is being used and/or wireless communications are being attempted near the outer edges or boundaries of a coverage area of a wireless network. Embodiments of the present invention substantially reduce and/or eliminate noise or other interference caused by components within electronic device from adversely affecting the wireless communications. Embodiments of the present invention provide an intermediate conductive path to ground on cable 30 for re-directing all or a portion of any noise that may be radiated onto cable 30 away from antenna 28 and back toward the noise source (e.g., chip 22a). For purposes herein, a ground is a direct electrical connection to a particular point in an electrical or electronic circuit, such as a chassis 44. The ground provides a point that can be considered to have zero voltage. In the embodiment illustrated in FIGS. 1a and 1b, a portion of an outer jacket or insulator layer 34 of cable 30 is removed, thereby exposing at least a portion of cable 30 disposed beneath the insulator layer 34 (e.g., the shield layer of the cable). Embodiments of the present invention ground the portion of exposed cable 30 so as to substantially prevent or eliminate noise from propagating or continuing along a remaining portion of cable 30 to antenna 28.

Preferably, the portion of insulator layer 34 removed from cable 30 is located at an intermediate location of cable 30 (e.g., a location of cable 30 disposed between antenna 28 and module 26) such that a gap or break in the insulator layer 34 is formed so that insulator layer 34 remains on cable 30 on each side of the grounded portion. Thus, for example, in the embodiment illustrated in FIGS. 1a and 1b, insulator layer 34 is removed from at least a portion of cable 30 to form an exposed portion 36 of cable 30, thereby resulting in an insulator layer portion 34a remaining on cable 30 between exposed portion 36 and module 26 and an insulator layer portion 34b remaining on cable 30 between exposed portion 36 and antenna 28. Preferably, insulator layer 34 is removed from an entire circumference of cable 30 to form exposed portion 36 (e.g., thereby resulting in an end 35a of insulator layer 34a being spaced apart from an end 35b of insulator layer 34b). In the embodiment illustrated in FIGS. 1a and 1b, exposed portion 36 is formed at or near a furthermost or distal end of cable 30 relative to module 26 before cable 30 exits base member 18 to substantially prevent or eliminate noise from coupling onto a remaining portion of cable 30 disposed within base member 18 before cable 30 transitions to display member 16. However, it should be understood that exposed portion 36 may be otherwise located on cable 30 (e.g., in a transition area between base member 18 and display member 16 or within display member 16). In the embodiment illustrated in FIGS. 1a and 1b, a single exposed portion 36 is formed to ground cable 30. However, it should be understood that cable 30 may be intermediately grounded at multiple locations along its length.

In the embodiment illustrated in FIGS. 1a and 1b, noise suppression system 12 comprises a conductive element 38 for covering and/or grounding exposed portion 36 of cable 30 (e.g., the portion of insulator layer 34 removed from cable 30 is replaced with conductive element 38). In some embodiments of the present invention, conductive element 38 comprises a conductive elastomer tube 40 having a hollow interior for receiving cable 30 therein (e.g., to facilitate sliding of tube 40 over an end of cable 30 and sliding of tube 40 along cable 30 to the location of exposed portion 36). However, it should be understood that conductive element 38 may be otherwise configured (e.g., a conductive element wrapped around exposed portion 36 and otherwise secured to cable 30). Preferably, conductive element 38 comprises a spongy/compressible conductive elastomeric material; however, it should be understood that conductive element 38 may be otherwise configured (e.g., a non-elastomeric and/or non-spongy material). In the embodiment described above, a portion of insulator layer 34 is removed from cable 30 and the exposed portion 36 grounded so as to facilitate use of an off-the-shelf coaxial or other type of cable. However, it should be understood that cable 30 may be specially manufactured having an intermediate location formed with a conductive element or portion to enable grounding of an intermediate portion of cable 30 disposed beneath the insulator layer 34. Preferably, conductive element 38 covers exposed portion 36 and extends at least slightly onto and/or over insulator layer portions 34a and 34b. In the embodiment illustrated in FIGS. 1a and 1b, conductive element 38 is disposed in contact with a portion of chassis 44 for grounding thereof. However, it should be understood that the intermediate portion of cable 30 and/or element 38 may be otherwise grounded.

FIG. 2 is a diagram illustrating a section view of system 12 of FIGS. 1a and 1b taken along the line 2-2 of FIG. 1b. In the embodiment illustrated in FIG. 2, cable 30 comprises a center conductor 48, an inner dielectric or insulator layer 50 covering center conductor 48, a conductive braided shield layer 52 disposed around the inner insulator layer 50 and outer jacket or insulator layer 34.

FIG. 3 is a diagram illustrating a section view of system 12 of FIGS. 1a and 1b taken along the line 3-3 of FIG. 1b. In the embodiment illustrated in FIG. 3, cable 30 comprises a center conductor 48, an inner dielectric or insulator layer 50 covering center conductor 48, a conductive braided shield layer 52 disposed around the inner insulator layer 50 and outer jacket or insulator layer 34 (FIGS. 1a and 1b). In the embodiment illustrated in FIG. 3, conductive element 38 is disposed around cable 30 and over exposed portion 36 of braided shield layer 52 in place of a removed portion of insulator layer 34 (FIGS. 1a and 1b) such that conductive element 38 is in electrical contact with braided shield layer 52. For example, conductive element 38 is preferably configured from a compressible material such that conductive element 38 may be deformed and/or otherwise manipulated to contact braided shield layer 52. In FIG. 3, an outer surface 46 of conductive element 38 is disposed in contact with a portion of chassis 44 or other grounding element to form a conductive path to ground. Preferably, conductive element 38 is configured from a compressible material such that conductive element 38 may be deformed and/or otherwise manipulated to place a greater surface area of outer surface 46 in contact with chassis 44. Thus, in the embodiment illustrated in FIG. 3, outer surface 46 of conductive element 38 is compressed against chassis 44 along areas 58 and 60 to provide a greater conductive path to ground; however, it should be understood that conductive element 38 may be disposed in contact with only area 58 or area 60 of chassis 44, or any other surface(s) of chassis 44. It should also be understood that a length of conductive element 38 (e.g., measured along a length of cable 30) may be otherwise varied to provide a desired level of grounding surface area of conductive element 38.

Thus, embodiments of the present invention provide a noise suppression system 12 to reduce interference otherwise caused by the operation of components within device 10. Embodiments of the present invention enable noise that may otherwise travel along cable 30 toward antenna 28 to be grounded at an intermediate location of cable 30 to substantially prevent or eliminate interference with functionality of antenna 28.

What is claimed is:

1. A wireless communications noise suppression system, comprising:
   an electronic device having wireless module communicatively coupled to an antenna via a cable, an intermediate portion of the cable conductively coupled to ground; and
   a conductive element coupled to ground and disposed between a gap formed in an insulator layer of the cable.

2. The system of claim 1, wherein the conductive element comprises a conductive cover coupled to ground and disposed around the intermediate portion of the cable.

3. The system of claim 1, wherein the conductive element is disposed in place of a removed portion of the insulator layer of the cable and wherein the cable includes an electrical conductor continuously extending across the gap.

4. The system of claim 1, wherein the conductive element comprises a conductive elastomer cover coupled to ground and disposed around the intermediate portion of the cable.

5. The system of claim 1, wherein the conductive element comprises a compressible conductive element coupled to ground and disposed around the intermediate portion of the cable.

6. The system of claim 1, wherein the conductive element comprises a conductive element coupled to ground and disposed in contact with a braided shield layer of the cable at the intermediate portion.

7. The system of claim 6, wherein the conductive element conductively contacts a chassis of the electronic device.

8. The system of claim 1, wherein the insulator layer extends on opposite axial ends of the gap and wherein the cable includes an electrical conductor that continuously and without interruption extends across the gap beyond each of the opposite axial ends of the gap.

9. The system of claim 1, wherein the conductive element extends only partially along the cable so as to substantially prevent or eliminate noise from propagating or continuing along the remaining portion of the cable to the antenna.

10. The system of claim 1, wherein the cable has first and second axial ends and wherein the conductive element has first and second axial ends between and spaced from the first and second axial ends of the cable and wherein the cable includes an electrical conductor continuously extending without interruption from the first axial end of the cable to the second axial end of the cable.

11. The system of claim 1, wherein the conductive element conductively contacts a chassis of the electronic device.

12. A method of manufacturing wireless communications noise suppression system, comprising:
    providing an electronic device having a wireless module coupled to an antenna via a cable; and
    conductively coupling an intermediate portion of the cable to ground by disposing a grounded conductive element in a gap formed in an insulator layer of the cable.

13. The method of claim 12, further comprising replacing a portion of an insulator layer of the cable at the intermediate portion with the conductive element coupled to ground while leaving intact an electrical conductor of the cable extending across the gap.

14. The method of claim 12, wherein the grounded conductive element comprises a grounded conductive elastomer cover around the cable at the intermediate portion.

15. The method of claim 12, wherein the grounded conductive element comprises a grounded conductive compressible cover around the cable at the intermediate portion.

16. The method of claim 12, further comprising disposing the grounded conductive element in contact with a braided shield layer of the cable at the intermediate portion.

17. The method of claim 12 further comprising positioning the conductive element in conductive contact with a chassis of an electronic device.

18. A wireless communications noise suppression system, comprising:
    cable means for communicatively coupling an antenna means to a wireless module means in an electronic device, an intermediate portion of the cable means conductively coupled to ground; and
    means, grounded and disposed in a gap formed in an insulator layer means of the cable means at the intermediate portion, for grounding the cable means.

19. The system of claim 18, wherein the means, grounded and disposed in the gap is in contact with a braided shield layer means of the cable means at the intermediate portion, for grounding the cable means.

20. The system of claim 18, wherein the means, grounded and disposed in the gap is in place of a portion of the insulator layer means of the cable means at the intermediate portion, for grounding the cable means and wherein the cable means includes an electrical conductor extending across the gap.

\* \* \* \* \*